A. SMITH.
Shovel Plow.
No. 20,823.
Patented July 6, 1858.
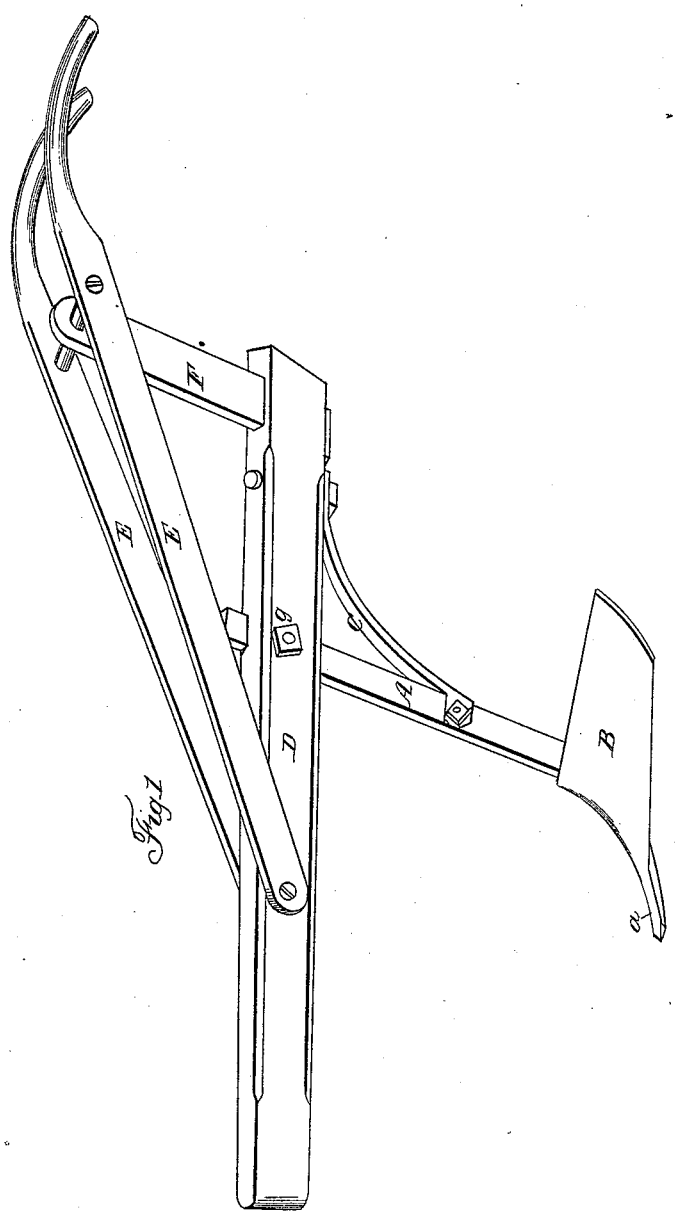

UNITED STATES PATENT OFFICE.

ASBERRY SMITH, OF ASHVILLE, ALABAMA.

IMPROVEMENT IN COTTON-CULTIVATORS.

Specification forming part of Letters Patent No. 20,823, dated July 6, 1858.

*To all whom it may concern:*

Be it known that I, ASBERRY SMITH, of Ashville, in the county of St. Clair, in the State of Alabama, have invented an Improved Cotton-Cultivator; and I do hereby declare that the following is a full and exact description thereof, reference being had to the accompanying drawing and the letters of reference marked thereon.

The nature of my invention relates to the peculiar form and construction of the blade and the position thereof with regard to its upright or support A, for the purposes as hereinafter more fully set forth.

Figure 1 is a perspective view of my improved cotton-cultivator.

A represents the upright or support. This is made of wrought-iron, and is about five-eighths of an inch in thickness, and from an inch and three-quarters to two inches in width, and about two feet in length, and is slightly curved or circular in that part to which the blade is attached, as represented in the drawing. The point *a* projects about three inches below the lower edge of the blade. This support is made fast to the beam D by means of a half-mortise in the beam and the screw-bolt *g*.

B represents the blade or share. This is made of wrought-iron, and is welded or otherwise fastened to the upright. It is made about twelve inches in length, and about four and a half inches in width. It projects to the left from the upright at an angle of a few degrees less than a right angle from the line of draft. It is slightly curved or concaved to correspond to the curve or bend of the upright at its connection therewith. Its lower edge is made quite sharp, so as to cut the soil and weeds easily.

C represents an iron brace. This extends from the upright to the beam. It clasps the upright, and is secured thereto by means of a bolt. It is also secured to the beam by means of a bolt. It is put in rear of the upright so as to prevent clogging. D, beam or main timber of the frame; E, handles; F, post. There is nothing novel in this frame-work.

Practically this is considered to be a valuable improvement. It will penetrate the ground to any required depth, and will effectually pulverize and loosen the soil and shave or cut off all the weeds. It will run close to the stalks of cotton and pulverize and loosen the soil near the roots without injuring or disturbing the roots. It does not make a furrow nor turn over the soil, but loosens and shakes it up, and allows the soil to slide up the blade and drop back into its place again. It is peculiarly adapted to the cultivation of cotton. One-horse power is sufficient to propel it.

What I claim in the construction of cotton-cultivators is—

The arrangement of the upright A, brace C, beam D, and support F, so that a plane will pass through or near the whole of them, and when the wing B is connected to and projects from the said upright A, all as herein set forth.

ASBERRY SMITH.

Witnesses:
   E. B. FORBUSH,
   F. I. MURPHEY.